(12) United States Patent
Brandt

(10) Patent No.: US 7,175,798 B2
(45) Date of Patent: Feb. 13, 2007

(54) CUTTING TOOL INSERT AND METHOD FOR PRODUCING THE SAME

(75) Inventor: Gunnar Brandt, Solna (SE)

(73) Assignee: Sandvik Intellectual Property AB, Sandviken (SE)

( * ) Notice: Subject to any disclaimer, the term of this patent is extended or adjusted under 35 U.S.C. 154(b) by 0 days.

(21) Appl. No.: 10/763,260

(22) Filed: Jan. 26, 2004

(65) Prior Publication Data

US 2004/0180776 A1    Sep. 16, 2004

(30) Foreign Application Priority Data

Jan. 28, 2003    (EP) ................................. 03001757

(51) Int. Cl.
*B28B 3/02*    (2006.01)
*H05B 6/00*    (2006.01)
*C04B 35/645*  (2006.01)
*C04B 35/10*   (2006.01)

(52) U.S. Cl. ...................... 264/434; 264/641; 264/666; 264/604; 264/125

(58) Field of Classification Search ................ 264/125, 264/434, 604, 666, 641; 419/52
See application file for complete search history.

(56) References Cited

U.S. PATENT DOCUMENTS

| | | | |
|---|---|---|---|
| 4,209,474 A * | 6/1980 | Prochazka | ................. 264/29.5 |
| 4,543,345 A | 9/1985 | Wei | |
| 5,348,694 A | 9/1994 | Goldberger | |
| 5,382,405 A * | 1/1995 | Lowrance et al. | .......... 505/125 |
| 5,418,197 A * | 5/1995 | Brandt | ........................ 501/89 |
| 6,417,126 B1 * | 7/2002 | Yang | ........................... 501/127 |
| 2005/0133963 A1* | 6/2005 | Zhan et al. | ................. 264/434 |

OTHER PUBLICATIONS

Zhijian Shen, Mats Johnsson, Zhe Zhao, Mats Nygren, Spark Plasma Sintering of Alumina, J. Am. Ceramic Soc., vol. 85, No. 8, (Aug. 2002) 1921-1927.*

Mishra, R.S., A.K. Mukherjee, Electric pulse assisted rapid consolidation of ultrafine grained alumina matrix composites, Materials Science and Engineering A287 (2000) 178-182.*

Paul Becher, Chun-Hway Hsueh, Peter Angelini, Terry Tiegs, Toughening Behavior in Whisker-Reinforced Ceramic Matrix Composites, J. Am. Ceramic Society, vol. 85, No. 12 (1988) 1050-1061.*

(Continued)

*Primary Examiner*—Christina Johnson
*Assistant Examiner*—Matthew J. Daniels
(74) *Attorney, Agent, or Firm*—Drinker Biddle & Reath LLP

(57) ABSTRACT

An improved cutting tool insert and a method for the preparation of such cutting tool insert, having a sintered alumina and silicon carbide whisker composite material body, comprising the steps of milling and mixing the powdered starting materials of said composite material and forming said material into a preformed workpiece, heating up said workpiece at a heating rate of from about 20 to about 60° C. per minute to a sintering temperature of between from about 1600 to about 2300° C., and holding at said sintering temperature for a holding time of from about 5 to about 60 minutes at a pressure of between from about 20 to about 100 MPa.

29 Claims, 1 Drawing Sheet

OTHER PUBLICATIONS

Abstract from L. Gao, H.Z. Wang, J.S. Hong, H. Miyamoto, K. Miyamoto, Y. Nishikawa, S.D.D.L. Torre, Journal of the European Ceramic Society, vol. 19, No. 5 (May 1999) 609-613.*

Oh, Sung-Tag et al., "Porous Alumina and Alumina-Based Nancomposite Fabricated by Pulse Electric Current Sintering", Ceramic Transactions, Ceramic Processing Science VI, vol. 112, pp. 565-570.

Rongti, Li et al., "Microstructure and Mechanical Properties of Al2O3/SiC Nanocomposites Prepared by SPS", Key Engineering Materials, vols. 224-226, pp. 337-340, 2002.

Choa, Yong-Ho et al., "Microstructure and Mechanical Properties of Oxide Based Nanocomposites Fabricated by Spark Plasma Sintering", Key Engineering Materials, vols. 132-136, pp. 2009-20012, 1997.

Becher et al., The Design and Properties of Ceramics Reinforced by Whiskers and Similar Microstructural Features, Materials Engineering 1996, vol. 7, No. 2-3, pp. 151-181.

König und Gerschwiler, Zähigkeitsverhalten keramischer Schneidstoffe, VDI-Z 131, 1989, No. 1, Jan., pp. 52-58.

Tiegs and Becher, Thermal Shock Behavior of an Alumina-SiC Whisker Composite, J. Am. Ceram. Soc., 70 (5), 1987, pp. C-109-C-111.

Niihara, New Design Concept of Structural Ceramics—Ceramic Nanocomposites, Journal of The Ceramic Society of Japan 99 (10), 1991, pp. 974-982.

* cited by examiner

Present invention
*Fig. 1a*  *Fig. 1b*
Commercial grade A
*Fig. 2a*  *Fig. 2b*

CUTTING TOOL INSERT AND METHOD FOR PRODUCING THE SAME

FIELD OF THE INVENTION

The present invention relates to a cutting tool insert of an improved ceramic material, and a method for preparing the same.

BACKGROUND OF THE INVENTION

Ceramic materials for cutting tool applications include alumina, alumina-zirconia, alumina-TiC-TiN, silicon nitride, sialon, and SiC-whisker reinforced alumina. The cutting tool environment puts simultaneous high demands on the strength, toughness and thermal shock resistance in addition to the obvious demands for high wear resistance.

The mechanical properties of ceramic materials are to a high extent influenced by internal and external defects, such as inclusions of foreign matter, pores, large grains and cracks. In order to improve reliability and performance of cutting tools made of ceramic materials, it is necessary to identify detrimental defects in the products and to set up the processing route in order to minimize undesirable features. Since ceramic materials have a completely elastic behavior up to temperatures of about 1000° C., the stress concentrations created by the defects cannot be eliminated by relaxation due to plastic deformation.

Ceramic materials for metal cutting tools are produced by milling of the constituents in a liquid and subsequent drying of the slurry. Spray drying is the preferred drying method for materials that do not require hot pressing. Spray drying produces granules with a size of 50–200 microns. The large granules give very good powder flow properties, which is essential for mass production of blanks with uniaxial cold pressing.

It is now well-established that defects in a sintered body can be related to the pore size and distribution in the green compact. This is especially important for materials that are sintered without pressure or with low pressure (gas pressure sintering), since large pores will not be eliminated. The granule characteristics, and especially their deformation behavior, will be the primary parameters that determine the defect structure in the green state. Considerable increases in strength of the sintered material have been achieved by reducing the granule compression strength, since dense and hard granules will retain their shape even after compression.

Besides pore size and pore distribution, the grain size is also essential to the mechanical properties of ceramic materials. A fine and uniform grain size provides for a high strength and a small variation of the strength. The grain size of ceramic materials is closely related to the sintering conditions.

Alumina and alumina-zirconia materials are preferably produced by ressureless sintering in an appropriate atmosphere. In many cases, this is the preferred sintering technique for ceramic materials, since it is a relatively low-cost process and enables complex shaped parts to be produced.

Silicon nitride and sialon materials are normally produced by gas pressure sintering, whereby a gas pressure of from about 0.1 to about 1 MPa is applied, once closed porosity is reached in the material. This enables higher densities to be reached at lower sintering temperatures, especially when using low amounts of sintering additives to form a liquid phase.

Hot isostatic pressing (HIP) is another sintering technique that is used for materials that cannot be consolidated without external pressure. Pressures of from about 1 to about 10 MPa are normally used, but the method demands an encapsulation, for example in glass, to transmit the gas pressure. HIP can also be used to remove remaining porosity after conventional sintering or hot pressing to closed porosity, the advantages being that HIP, due to the high pressure, is performed at a lower temperature than the sintering temperature, which is why a more fine grained material is obtained.

Hot pressing (HP) is the preferred method for materials difficult to be sintered, like silicon whisker reinforced alumina, and also for mixed ceramics, like alumina-TiC. The pressure of normally from about 25 to about 35 MPa is uniaxially transferred to the material with graphite punches. Rather large cylindrical discs are obtained, which are then diamond saw cut to the required dimensions of the blanks. The diamond saw cutting is a rather expensive part of the blank production process, amounting to from about 30 to about 40% of the production costs per blank.

U.S. Pat. No. 4,543,345 describes a method for the production of silicon carbide whisker reinforced alumina with from about 5 to about 60% by volume SiC-whiskers to a sintered density of greater than 99%. The process requires a pressure of from about 28 to about 70 MPa, a temperature of from about 1600 to about 1900° C., and a hold time at sintering temperature of 45 minutes to 2 hours. Pressures and sintering temperatures in the higher range are needed for higher whisker loadings. The combination of long sintering times and high sintering temperatures in this hot pressing sintering method leads to alumina grain growth in spite of the grain growth inhibiting effect of the silicon carbide whiskers. Large alumina grains will affect he performance in cutting tool applications, since the largest defect determines the strength of the material.

Another method, spark plasma sintering (SPS), applies electrical energy pulses directly to the gaps between the powder particles, which are placed between graphite punches. SPS utilizes the energy of the spark plasma generated by the spark discharges. The pressure is directly applied on the powder bed in an uniaxial direction.

Another method uses a particulate solid as the pressure-transmitting medium, which is why such method is referred to as "pseudo-isostatic." Such method can be used to consolidate preforms of more complicated shape.

U.S. Pat. No. 5,348,694 describes a sintering method, wherein the preformed green blank is heated by electrical resistive heating of a granular pressure-transmitting medium, which is in contact with the preform inside a die chamber. The pressure-transmitting medium is electrically conductive, e.g., graphitic carbon granules. This electrical resistive heating method enables very high temperatures and rapid heating times, making it suitable for materials that require high sintering temperatures. The pressure that can be applied is limited by the strength of the material in the rams and die, which for high temperatures is normally graphite. The pressure is therefore usually not much higher than about 100 MPa.

OBJECT AND SUMMARY OF THE INVENTION

It is the object of this invention to provide a cutting tool insert having a sintered alumina and silicon carbide whisker composite material body and a method for preparing the same, wherein the cutting tool insert exhibits improved wear resistance and toughness behavior in metal cutting applications.

In one aspect there is provided a method for the preparation of a cutting tool insert comprising the steps of milling and mixing powders of alumina and silicon carbide whiskers; forming said mixture into a preformed workpiece; holding said workpiece at a heating rate of 20 to 60° C. per minute to a sintering temperature of between 1600 to 2300° C.; and holding at said sintering temperature for a holding time of 5 to 60 minutes at a pressure of between 20 to 100 MPa.

In addition, there is provided the product made by the above-described process.

BRIEF DESCRIPTION OF THE FIGURES

FIG. 1a is a scanning electron micrograph in 8000 times magnification of a sample produced according to the method of the present invention, described in example 1 below and being treated according to Example 5 below;

FIG. 1b is the micrograph of FIG. 1a after image processing as described in Example 5 below;

FIG. 2a is a scanning electron micrograph in 8000 times magnification of a commercially available grade (commercial grade A, see Example 6 below), being treated according to Example 5 below;

FIG. 2b is the micrograph of FIG. 2a after image processing as described in Example 5 below;

DETAILED DESCRIPTION OF THE INVENTION

The method of the present invention will herein be referred to as "rapid sintering." The method combines the use of high sintering temperature, a high temperature rise up to the sintering temperature, short holding times at the sintering temperature and at the same time, the application of a high pressure. The method of the present invention, having combined the aforementioned parameters, results in a whisker reinforced ceramic material for cutting tools with improved performance due to inhibition of defects due to grain growth. The method maintains a fine and uniform alumina grain size due to rapid heating, the sintering temperature and a short holding time at this temperature while maintaining full shrinkage and densification. The cutting tools produced according to the method of the present invention exhibit superior wear resistance and toughness behavior over similar cutting tool materials having the same composition, but produced by a different sintering method.

A very surprising effect has been observed by the present inventor, which will be discussed and evidenced in more detail below: Two materials of the same composition have been produced by the hot pressing sintering method and according to the method of the present invention, respectively. Both materials showed very similar or almost identical mechanical properties and microstructure characteristics in respect of density, hardness, fracture toughness, and strength. But surprisingly the material produced according to the method of the present invention showed much better cutting tool performance in respect of tool life and notch wear.

The afore-mentioned difference in tool performance of the material produced according to the present invention is referred to a combination of the mean alumina grain size and other micro-structural material properties, which have not yet been explained in detail, but which appear to be closely related and a result of the sintering process conditions specified in this invention. Accordingly, in a preferred embodiment of the cutting tool insert produced by the method of the present invention the mean alumina grain size is 2.0 μm or less, preferably less than 1.5 μm, more preferred less than 1.0 μm, and most preferred less than 0.9 μm.

It has further been found that the improved performance of the cutting tool insert of the present invention seems to be related to a low width of the alumina grain size distribution. Since the alumina grain size distribution in the material of the present invention does not follow an ideal Gaussian distribution, but is rather asymmetric, the grain size standard deviation is not a useful measure for the alumina grain size distribution. The alumina grain size distribution is therefore determined by the $80^{th}$ percentile (P80) of the width of the alumina grain sizes. P80 is the value of the alumina grain size (d), such that 80% of all alumina grain size measurements are less than that value.

Improved performance of the cutting tool insert of the present invention is found in a embodiment wherein the alumina in the composite material has a $80^{th}$ percentile (P80) of less than 2.5 μm, preferably less than 2.0 μm, more preferred less than 1.8 μm, most preferred less than 1.3 μm.

It has been found that these mean diameter and P80 values of the alumina in the composite material of the invention are achieved by applying the rapid sintering method according to the present invention, whereas standard hot pressing results in higher mean diameter and higher P80 values accompanied by inferior cutting tool performance.

In a preferred embodiment of the invention, the rapid sintering method comprises the steps of heating up the workpiece to be sintered by applying electrical energy in the form of a DC current, that at least partially goes through said workpiece. In another preferred embodiment, said current may either be unpulsed or pulsed DC current.

In another preferred embodiment, the method of the present invention includes the rapid sintering method, as it is described in U.S. Pat. No. 5,348,694 hereinafter incorporated in full by reference. Accordingly, the method of the present invention comprises the steps of providing a bed comprising a bed material of electrically conductive, flowable particles within a contained zone, placing the workpiece in the bed, applying a pressure to said bed, applying electrical energy to said electrically conductive, flowable particles within the bed in a sufficient amount to heat the bed to the desired sintering temperature for the workpiece within the desired heating rate. This method allows for a rapid heating up to the sintering temperature at a steep heating ramp at a desired pressure of up to 100 MPa. This method allows for high sintering temperatures compared to other known sintering methods with high heating rates. The method further allows at the same time for high sintering pressures to 100 MPa, depending on the strength of the graphite tools. The bed material of electrically conductive, flowable particles, useful in the method of the present invention, comprises graphite, preferably spherical graphite or carbided graphitic material.

Rapid sintering according to the present invention includes a high heating rate or steep heating ramp, respectively, high sintering temperatures, and short sintering times. All of these parameters have been found contribute to small alumina grain sizes, small P80 values and to superior tool performance, which seems to be the result of a combination of said small alumina grain sizes, small P80 values and one or more other parameters, which is/are resulting from the rapid sintering method.

Thus, in another preferred embodiment of the method of the present invention, the sintering temperature is between from about 1800 to about 2100° C., more preferably between from about 1900 to about 2000° C. The heating rate is preferably from about 20 to about 40° C. per minute, and most preferably about 25° C. per minute.

Even though holding times up to 60 minutes may be applied, depending on the composition of the material, shorter holding times are preferred to avoid alumina grain growth. In a preferred embodiment, the holding time is from about 5 to about 30 minutes, more preferably from about 10 to about 20 minutes, and most preferably about 15 minutes.

A useful pressure for the method of the invention lies within the range of from about 20 to about 100 MPa. In a more preferred embodiment, the pressure is from about 30 to about 100 MPa, most preferably from about 40 to about 100 MPa. In most cases a pressure of about 50 MPa is suitable.

In another preferred embodiment, the composite material produced according to the method of the present invention comprises alumina plus silicon carbide whiskers in a total proportion of at least 90% by volume. The proportion of silicon carbide whiskers in said composite material is preferably from about 5 to about 70% by volume, more preferably from about 15 to about 50% by volume, and most preferred from about 20 to about 45% by volume.

The composite material produced according to the method of the present invention may additionally comprise a certain amount of sintering additives like magnesia or yttria. In a preferred embodiment of the present invention, magnesia and/or yttria may each be comprised in the composite material in a proportion of from about 0.01 to about 5% by weight, preferably in a proportion of from about 0.02 to about 1% by weight, most preferred in a proportion of from about 0.03 to about 0.5% by weight.

The invention is additionally illustrated in connection with the following Examples which are to be considered as illustrative of the present invention. It should be understood, however, that the invention is not limited to the specific details of the Examples.

EXAMPLE 1

For comparison, cutting tool inserts of alumina-silicon carbide whisker composite material were prepared, both conventionally with hot pressing and by rapid sintering according to the present invention, using a direct electrically heated powder bed with preforms of the material to be sintered. In this and the following examples, the method of the present invention will simply be designated as "rapid sintering."

A mixture of 71% by volume alumina (Ceralox APA, −0.3 μm grain size) and 29% by volume silicon carbide whiskers (Advanced Composite Materials Corp. SC-9, average diameter −0.6 μm) were put together. 0.04% by weight each of magnesia (Magnesium Electron Ltd.) and yttria (A.C. Starck, grade standard) as sintering additives and 1.25% by weight PVA (Mowiol 4–88), 1.5% by weight PEG300 (Pluriol E-300), and 1.5% by weight PEG1500 (Pluriol E-1500) as pressing aids to enable uniaxial cold pressing were added, and the composition was wet-milled to obtain a homogeneous mixture.

For the conventional preparation with hot pressing (HP), the mixture was freeze dried to obtain granules, cold pressed into a disc, and presintered at 600° C. for one hour in air to remove the pressing aid. Subsequently, the material was hot pressed for one hour at 1875° C. and 25 MPa. The sintered disc was diamond saw cut into blanks, which were then ground to inserts with ISO-designation RNGN 120700 T01020.

For preparation with rapid sintering according to the present invention, the mixture was freeze dried to obtain granules, cold pressed into blanks, which were then presintered at 600° C. for one hour in air to remove the pressing aid. The blanks were then coated with a thin BN-layer to prevent reaction with the graphite of the electrically heated powder bed. The same coating with a BN-layer had been applied to the above material in the hot pressing of discs. The blanks were then placed in a die chamber filled with electrically conductive graphitic carbon, whereby a porous graphitic carbon of spheroidal form (Superior Graphite Co., grade 9400) was used. Heating was done by passing an electrical current through the medium. The temperature was raised with 25° C. per minute, and the sintering temperature was 1925° C., which was held for 15 minutes at a pressure of 50 MPa. Blank temperature was calculated as a function of time and location in the die, using a computer model. The blanks were then allowed to cool down in the furnace, and no additional heat treatment was performed. After sintering, the blanks were ground to inserts with ISO-designation RNGN 120700 T01020.

EXAMPLE 2

The samples (blanks) of Example 1 (prepared by hot pressing and rapid sintering, respectively) were tested in a grooving operation in heat resistant alloy of the type Inconel 718. A groove was widened in two cuts by a total of about 30%. Tool life was reached when the largest dimension of a damage on the flank or rake face exceeded 1 mm.

The following cutting conditions were used:
Cutting fluid: yes
Cutting speed: 250 m/min
Feed: 0.15 and 0.25 mm/rev
Depth of cut: 6 mm

TABLE 1

| | | Number of cycles to tool life | | | | | | |
|---|---|---|---|---|---|---|---|---|
| | Sintering | Number of Cycles | | | | | | |
| Feed | Method | Exp. 1 | Exp. 2 | Exp. 3 | Exp. 4 | Exp. 5 | Average | Relative |
| 0.15 mm/rev | Hot pressing | 5 | 4 | 3 | 4 | 4 | 4 | 100 |
| | Rapid Sint. | 6 | 7 | 5 | 7 | 5 | 6 | 150 |
| 0.25 mm/rev | Hot Pressing | 3 | 3 | 2 | 3 | 4 | 3 | 100 |
| | Rapid Sint. | 3 | 5 | 3 | 3 | 5 | 3.8 | 128 |

At a feed rate of 0.15 mm/rev the increase in tool life is 50%, and at a feed rate of 0.25 mm/rev the increase is 28%.

EXAMPLE 3

Using the samples (blanks) of Example 1, notch wear was measured in facing operation in heat resistant alloy of the type Inconel 718.
The following cutting conditions were used:
Cutting fluid: Yes
Cutting Speed: 220 m/min
Depth of cut: 1.5 mm
Feed: 0.11 mm/rev
Notch wear was measured after two cuts.

TABLE 2

Notch wear (mm) after two cuts

| Sintering Method | Notch wear (mm) after two cuts | | | | | | Average | Relative |
|---|---|---|---|---|---|---|---|---|
| | Exp. 1 | Exp. 2 | Exp. 3 | Exp. 4 | Exp. 5 | Exp. 6 | | |
| Hot pressing | 0.59 | 0.58 | 0.31 | 0.71 | 0.61 | 0.72 | 0.60 | 100 |
| Rapid Sintering | 0.43 | 0.21 | 0.27 | 0.58 | 0.46 | 0.66 | 0.45 | 75 |

With the cutting tool insert produced according to the rapid sintering method of the present invention, a reduction in notch wear to about 75% was achieved, or in other words, an increase in notch wear resistance of about 25% was achieved.

EXAMPLE 4

The samples produced according to the methods of Example 1 were characterized in respect of physical and mechanical properties and microstructural characteristics. The measured mechanical properties were density, hardness, fracture toughness, and strength, which are indicated in Table 3 below.

TABLE 3

Mechanical Properties

| Sintering Method | Density g/cm$^3$ | Hardness HV10 GPa | Fracture Toughness Mpam$^{1/2}$* | Strength MPa** |
|---|---|---|---|---|
| Hot Pressing | 3.73 | 2080 ± 80 | 6.9 ± 0.6 | 995 |
| Rapid Sintering | 3.73 | 2110 ± 21 | 6.5 ± 0.2 | 1050 |

*Indentation (HV10) fracture toughness
**Biaxial bending test, only two values

There are surprisingly only small differences between the two materials with respect to the physical and mechanical properties, considering the large differences in cutting performance, i.e., tool life and notch wear. It was highly surprising that two materials showing almost identical mechanical properties in standard tests exhibited large differences in cutting performance. In a restrospective view, this may be explained by the obvious differences in temperature, since mechanical properties are determined at room temperature, whereas during examination of cutting performance the cutting edge will experience temperatures above 1000° C. It is well-known to experts in the art that mechanical properties and cutting tool performance often fall apart due to this temperature difference, but it is not at all predictable whether cutting tool performance is improved or worsened.

EXAMPLE 5

A more detailed microstructural characterization on the samples, according to Example 1 above, was made with the aid of automatic image analysis using an image of the grain structure produced by a scanning electron microscope (SEM). A polished surface of a sample, perpendicular to the pressing direction, was etched in hydrogen at 1000° C. to reveal the alumina grain boundaries, and thereafter it was etched in acid to remove any formed oxide or glassy layers. These layers are formed due to the presence of silicon carbide whiskers, which might oxidize during heat treatment. Scanning electron micrographs in 8000 times magnification were then recorded (see FIGS. 1*a* and 2*a*). The images were further processed using a computerized image analysis system by filling in the grain boundaries with black line color by hand. The areas covered by silicon carbide whisker grains were also filled with black color by hand. Since the whiskers are orientated preferably in the plain perpendicular to the hot pressing direction, they are easily identified due to their high aspect ratio. Further image processing in the image analyzer generated a black and white picture, where only the alumina grain boundaries and the SiC-whisker grains were visible to facilitate the measurements (see FIGS. 1*b* and 2*b*).

Determination of the mean grain size was based on measurement of the individual area of each grain completely within the least area border. The measurement was repeated eight times for different fields to obtain an adequate number of measurements. The equipment was calibrated, so that area measurements were made in μm$^2$. Between from about 405 to about 1150 grains were measured for each variant, depending on the grain size, which is from about 50 to about 100 grains per microscopic field. The pixel density was 1280×960.

The equivalent grain diameter (microns) was calculated, assuming each grain is a perfect sphere using the formula $$A_i = \pi d_1^2/4$$

Wherein: $A_1$=area for grain 1, and
$d_i$=equivalent diameter for grain i.

The mean diameter ($d_{mean}$) of the distribution was calculated using the formula $$d_{mean} = \Sigma d_i/n.$$

wherein is the number of measurements.

The 80$^{th}$ percentile (P80), which describes the width of the grain size distribution, is the value of the alumina grain size d, such that 80% of the measurements are less than that value. The calculated values for mean diameter and 80$^{th}$ percentile (P80) for the two materials of Example 1 are indicated in the following Table 4.

TABLE 4

Alumina grain size and P80

| Sintering Method | Mean diameter (microns) | P80 (microns) |
|---|---|---|
| Hot Pressing | 1.26 | 1.93 |
| Rapid Sintering (15 min) | 0.77 | 1.12 |

Table 4 shows that the material produced by rapid sintering according to the present invention has smaller alumina mean diameter and smaller alumina grain size distribution, both essential for the cutting performance. An increase in either of the parameters, which means an increase in the volume fraction of relatively coarse grains, reduces the cutting performance.

EXAMPLE 6

A number of commercial materials based on alumina and silicon whiskers have been characterized with respect to alumina grain size and distribution. All major suppliers are included in this investigation. Measurements were made in an identical manner to what is described in Example 5, and the results are presented in Table 5. The sample according to the present invention was prepared according to Example 1. All commercial materials had approximately the same composition, namely 25 weight-% SiC-whiskers, a small amount of sintering additives, and alumina as the remaining main constituent.

TABLE 5

Alumina grain size and P80

| Grade | Mean diameter (microns) | P80 (microns) |
|---|---|---|
| Commercial Grade A | 1.31 | 1.97 |
| Commercial Grade B | 1.04 | 1.48 |
| Commercial Grade C | 1.58 | 2.50 |
| Commercial Grade D | 1.34 | 2.07 |
| Rapid sintering (15 min) | 0.77 | 1.12 |

All commercial materials showed a larger mean grain size and a larger P80 than the material according to the present invention.

EXAMPLE 7

In order to study the influence of processing parameters three different holding times during sintering were evaluated. The samples were prepared according to the inventive method of Example 1, except for varying sintering times, i.e., the temperature increase was 25° C. per minute, the sintering temperature was 1925° C. (in case of 10 min holding time, the sintering temperature was slightly higher: 1950° C.), and the pressure was 50 MPa for all variants. The sintering times were 10 min, 15 min, and 22 min. After sintering, the blanks were ground into inserts with ISO designation RNGN 120700 T01020.

The mean alumina grain diameter and P80 were evaluated, using the same method, as described for the previous examples. The results are shown in Table 6.

TABLE 6

| Sintering time (min) | Sintering temp. (° C.) | Mean diameter (microns) | P80 (microns) |
|---|---|---|---|
| 10 | 1950 | 0.88 | 1.26 |
| 15 | 1925 | 0.77 | 1.12 |
| 22 | 1925 | 1.20 | 1.73 |

Hardness, fracture toughness and density were also evaluated for the processing variants. The results are shown in Table 7.

TABLE 7

| Sintering time (min) | Sintering temp. (° C.) | Density (g/cm$^3$) | Hardness (GPa) | Fracture toughness (Mpa m$^{1/2}$*) |
|---|---|---|---|---|
| 10 | 1950 | 3.72 | 2043 ± 16 | 5.8 ± 0.1 |
| 15 | 1925 | 3.73 | 2110 ± 21 | 6.5 ± 0.2 |
| 22 | 1925 | 3.70–3.73 | 2088 ± 33 | 5.6 ± 0.6 |

*Indentation (HV10) fracture toughness

EXAMPLE 8

Notch wear of the processing variants of Example 7 was measured in a operation in heat resistant alloy of the type inconel 718. Two of the above mentioned commercial materials were used as references. Commercial Grade A mean grain size typical for most investigated commercial grades and Grade B he smallest mean grain size of the measured commercial materials.

The following cutting conditions were used:

Cutting fluid: Yes

Cutting speed: 220 m/min

Depth of cut: 1.5 mm

Feed: 0.11 mm/rev

Notch wear was measured after four cuts.

TABLE 8

Notch wear (mm) after four cuts

| Grade | Notch wear (mm; median) | Relative |
|---|---|---|
| Commercial Grade A | 0.84 | 311 |
| Commercial Grade B | 0.59 | 219 |
| Rapid sintering 10 min | 0.61 | 226 |
| Rapid sintering 15 min | 0.27 | 100 |
| Rapid sintering 22 min | 0.77 | 285 |

The notch wear resistance is sensitive to sintering time. The best notch wear resistance was achieved for the 15 min sintering time. The alumina grain size is one parameter governing the notch wear resistance, but cannot alone explain the results.

EXAMPLE 9

The samples of the preceding Example 8 were also tested in a grooving operation in heat resistant alloy of the type Iconel 718. A groove was widened in two cuts by a total of about 30%. Tool life was reached when the largest dimension of a damage on the flank or rake face exceed 1 mm.

The following cutting conditions were used:
Cutting fluid: Yes
Cutting speed: 250 m/min
Feed: 0.25 mm/rev
Depth of cut: 6 mm

TABLE 9

Number of cycles to tool life

| Variant | Exp. 1 | Exp. 2 | Average | Relative |
|---|---|---|---|---|
| Commercial Grade A (prior art) | 8 | 10 | 11 | 183 |
| Commercial Grade B (prior art) | 7 | 5 | 6 | 100 |
| Rapid sintering 10 min | 14 | 13 | 13.5 | 225 |
| Rapid sintering 15 min | 13 | 11 | 12 | 200 |
| Rapid sintering 22 min | 8 | 5 | 6.5 | 108 |

The principles, preferred embodiments and modes of operation of the present invention have been described in the foregoing specification. The invention which is intended to be protected herein, however, is not to be construed as limited to the particular forms disclosed, since these are to be regarded as illustrative rather than restrictive. Variations and changes may be made by those skilled in the art without departing from the spirit of the invention.

The invention claimed is:

1. The method for the preparation of a cutting tool insert having a sintered alumina and silicon carbide whisker composite material body, comprising the steps of
    milling and mixing powders of alumina and silicon carbide whiskers;
    forming said mixture into a preformed workpiece;
    heating said workpiece at a heating rate of from about 20 to about 60° C. per minute by applying electrical energy in the form of a DC current that at least partially goes through said workpiece to a sintering temperature of between from 1800 to about 2300° C.; and
    holding said workpiece at said sintering temperature for a holding time of from about 5 to about 60 minutes at a pressure of between 20 to 100 MPa,
    wherein the proportion of silicon carbide whiskers in said composite material is from about 5 to about 50 % by volume and said alumina grain size in said composite material has a 80$^{th}$ percentile (P80) of less than 2.5 μm.

2. The method of claim 1 wherein said DC current is unpulsed.

3. The method of claim 1 wherein said DC current is pulsed.

4. The method of claim 1 comprising
    providing a bed comprising a bed material of electrically conductive, flowable particles within a contained zone,
    placing the preformed workpiece in said bed, and
    applying a pressure to said bed, and
    heating up said workpiece by applying electrical energy to said electrically conductive, flowable particles within said heating rate.

5. The method of claim 4 wherein the bed material of electrically conductive, flowable particles comprises graphite.

6. The method of claim 5 wherein the bed material comprises spherical graphite or carbided graphitic material.

7. The method of claim 1 wherein said sintering temperature is between from about 1800 to about 2100° C.

8. The method of claim 7 wherein said sintering temperature is between from about 1900 to about 2000° C.

9. The method of claim 1 wherein said heating rate is from about 20 to about 40° C. per minute.

10. The method of claim 9 wherein said heating rate is about 25° C. per minute.

11. The method of claim 1 wherein said holding time is from about 5 to about 30 minutes.

12. The method of claim 11 wherein said holding time is from about 10 to about 20 minutes.

13. The method of claim 12 wherein said holding time is from about 15 minutes.

14. The method of claim 1 wherein said pressure is from about 30 to about 100 MPa.

15. The method of claim 14 wherein said pressure is from about 40 to about 100 MPa.

16. The method of claim 1 wherein said composite material comprises alumina plus silicon carbide whiskers in a total proportion of at least 90 percent by volume.

17. The method of claim 15 wherein said composite material comprises alumina plus silicon carbide whiskers in a total proportion of at least 95 percent by volume.

18. The method of claim 1 wherein said composite material comprises silicon carbide whiskers in a proportion of from about 15 to about 50 percent by volume.

19. The method of claim 18 wherein said composite material comprises silicon carbide whiskers in a proportion of from about 20 to about 45 percent by volume.

20. The method of claim 1 wherein said alumina in said composite material has a mean diameter of less than 2.0 μm.

21. The method of claim 20 wherein said alumina in said composite material has a mean diameter of less than 1.5 μm.

22. The method of claim 21 wherein said alumina in said composite material has a mean diameter of less than 1.0 μm.

23. The method of claim 22 wherein said alumina in said composite material has a mean diameter of less than 0.9 μm.

24. The method of claim 1 wherein said alumina in said composite material has a 80th percentile (P80) of less than 2.0 μm.

25. The method of claim 24 wherein said alumina in said composite material has a 80th percentile (P80) of less than 1.8 μm.

26. The method of claim 25 wherein said alumina in said composite material has a 80th percentile (P80) of less than 1.3 μm.

27. The method of claim 1 wherein said composite material additionally comprises magnesia and/or yttria in a proportion from about 0.01 to about 5 percent by weight.

28. The method of claim 27 wherein said composite material additionally comprises magnesia and/or yttria in a proportion from about 0.02 to about 1 percent by weight.

29. The method of claim 28 wherein said composite material additionally comprises magnesia and/or yttria in a proportion from about 0.03 to about 0.5 percent by weight.

* * * * *